Patented July 20, 1948

2,445,535

UNITED STATES PATENT OFFICE 2,445,535

THERMOSETTING LENS CEMENT

William F. Parsons, Rochester, N. Y., and John R. Dann, Boulder, Colo., assignors to Eastman Kodak Company, Rochester, N. Y., a corporation of New Jersey No Drawing. Application March 19, 1945, Serial No. 583,646

11 Claims. (Cl. 260—77.5)

This invention relates to a glass lens and to a thermosetting lens cement, to a process for preparing a thermosetting lens cement, and to a process for cementing the elements of a lens with a thermosetting lens cement.

For cementing together the elements of glass lenses, especially those used in aerial optical instruments and those used in extremely cold or hot climates, it is desirable to have a colorless or nearly colorless cement which will adhere permanently to the glass, have considerable strength, and withstand any extremes of heat and cold which are likely to be encountered in use. Canada balsam has been used extensively as a lens cement, but suffers from the disadvantage that it does not withstand the extremes of temperature.

There has been found a lens cement which does withstand the extremes of temperature encountered in use much better than Canada balsam. This recently discovered lens cement (described in the copending application of H. C. Thuline, W. F. Parsons and G. P. Waugh, Serial No. 490,082, filed June 8, 1943, now U. S. Patent 2,438,953) comprises a mixture of a polymethacrylate ester, e. g., poly-n-butyl-a-methacrylate and an ester of a polyhydric alcohol and hydrogenated abietic acid, e. g., the glycerol ester of hydrogenated abietic acid. However, while this new lens cement is superior to Canada balsam, it is nevertheless a thermoplastic lens cement and exhibits two disadvantages in practice.

First, in the preparation of lenses of very high quality, such as objective and erector lenses, it was found that the aforesaid thermoplastic lens cement, although stable at 160° F., softened just enough at about this temperature to allow of plastic flow. While mounted lenses are held firmly enough in their mounts that there is little danger of lateral displacement of the lens elements cemented with the aforesaid thermoplastic cement, it was found that the lenses did sometimes, at elevated temperatures, develop other optical defects, such as astigmatism and poor definition. The reason for this is that minute irregularities in the mount used to hold the lens firmly in position caused uneven pressure to be exerted on the lens. At ordinary temperatures the lens and cement had sufficient mechanical strength to resist these uneven forces, providing they were not unduly great. However, at about 160° F., the thermoplastic cement softened slightly and tended to flow away from the high pressure area. The lens surface was thus slightly warped and the optical quality of the lens consequently deteriorated. In many cases, the deterioration makes the lens unsuitable for optical use, especially in objective and erector lenses which must form accurate images of objects.

Second, in cementing lens elements with thermoplastic lens cements, the lens element is heated to a temperature considerably above the melting point of the cement, so that the viscosity of the cement will be sufficiently low on contact with the lens element to facilitate its use. The cement is then melted onto one element of the lens, the other element placed in position and the union completed by pressing out air bubbles and excess cement. This process usually requires a temperature of between 300° and 350° F. The lens is then allowed to cool until the cement begins to harden. Then the elements are aligned by mechanical or optical means. Frequently in this aligning operation, the cooling cannot be satisfactorily controlled. The outer portion cools more rapidly than the inner, or points of the lens in contact with metal truing mechanisms conduct the heat away causing the cement to harden more quickly in one portion of the lens than in another. This has the effect of slightly warping the lens and leaving it under strain. The resulting strain must be removed by annealing the cemented lens to insure permanently good optical quality, and also to insure that the cement layer which is under strain does not become defective in subsequent field use. A defect of this nature may manifest itself as a fern-shaped cement "start." The annealing operation prevents this, but it is time consuming and requires precise technique to avoid excessive rejects.

We have now found a new process for cementing together the elements of lens with a thermosetting lens cement in which many of the aforesaid difficulties encountered with thermoplastic lens cements are obviated. Moreover, by means of our new process, we have produced lenses which withstand the extremes of temperature ordinarily encountered. We have also found new thermosetting lens cements and a process for preparing the same. It is, accordingly, an object of our invention to provide a new process for cementing together the elements of lenses. A further object is to provide lenses which withstand the extremes of temperature. A further object is to provide a new thermosetting lens cement and a process for preparing the same. Other objects will become apparent hereinafter.

In accordance with our new process, we cement the elements of lenses together by applying to a surface of a lens element a thermosetting resin in a partially polymerized, gelatinous condition.

Then we apply to the surface so treated a second lens element, work out the excess cement between the two surfaces, true the lens by mechanical or optical means at ordinary temperatures (not greater than 100° F.) and then heat the trued lens until the thermosetting resin sets. In this process no heating is required until the lens is trued and the process is especially well adapted to large scale production of highly precise optics.

The lenses obtained by our new process withstand the extremes of temperature very satisfactorily and retain excellent optical quality under all conditions usually encountered in the field. Owing to the fact that the lenses are trued at ordinary temperatures while the cement is still soft, no warping or straining is introduced usually, or if it is, it is all relieved by the time the lens is heated to set the cement.

The thermosetting cement employed should be partially polymerized and in the gel state so that it is soft enough to work, but stiff enough to hold the lens elements firmly in position when the lens is in optical true. The thermosetting cement employed should be one that undergoes a minimum of shrinking upon setting and should be substantially transparent.

We have found a thermosetting cement which is admirably suited to our new process. Our new thermosetting lens cement comprises the partial polymerization product of a mixture of:

(1) An organic compound containing a single $CH_2=C<$ group, e. g., a vinyl carboxylic ester, an acrylic ester, an α-methacrylic ester or a vinylbenzene.
(2) A divinylbenzene, acrylic anhydride or an α-alkacrylic anhydride.
(3) A diallyl compound or a di-2-alkallyl compound containing a chain of from 11 to 14 atoms between the two allyl or 2-alkallyl groups.

Advantageously, the organic compound containing the single $CH_2=C<$ group is an α-methacrylic ester of a monohydric alcohol containing from one to four carbon atoms, i. e., methyl, ethyl, n-propyl, isopropyl, n-butyl, isobutyl, sec-butyl or tertiary butyl α-methacrylate, especially n-butyl α-methacrylate. Vinyl acetate, propionate or butyrates are exemplary of the vinyl carboxylic esters. Methyl, ethyl, n-propyl and n-butyl acrylates are exemplary of the acrylates. Styrene is exemplary of the vinylbenzenes.

Divinylbenzene is preferred to either acrylic or an α-alkacrylic anhydride. Among the α-alkacrylic anhydrides, those in which the alkyl group contains from 1 to 2 carbon atoms are preferred, i. e., α-methacrylic and α-ethacrylic anhydride. Among the diallyl and di-2-alkallyl compounds, the bis allyl and 2-alkallyl carbonates of diethylene glycol and triethylene glycol are exemplary. The bis allyl or 2-alkallyl carbonate of diethylene glycol is advantageously employed. Among the 2-alkallyl compounds those in which the alkyl group contains from 1 to 2 carbon atoms are preferred, i. e., the 2-methallyl and 2-ethallyl compounds. The cement is prepared by partially polymerizing a mixture of the above three components. The polymerization is accelerated by heating and is advantageously carried out in the presence of a polymerization catalyst, e. g., a peroxide polymerization catalyst. Organic peroxides, such as benzoyl peroxide, acetyl peroxide or lauroyl peroxide, are especially useful. Inorganic peroxides, such as alkali metal persulfates, can be used. The polymerization is advantageously carried out in an atmosphere free from undesirable contaminants, such as sulfur compounds. Any such atmosphere can be employed, e. g., air, carbon dioxide or nitrogen.

Advantageously, the organic compound containing a single $CH_2=C<$ group and the diallyl compound (or the di-2-alkallyl compound) are employed in a weight ratio of from 8:2 to 2:8. Especially efficacious materials have been prepared employing equal parts by weight of the organic compound containing a single $CH_2=C<$ group and the diallyl compound (or di-2-alkallyl compound). Likewise, very useful cements have been prepared using about 7 parts by weight of the organic compound containing a single $$CH_2=C<$$

group and 3 parts by weight of the diallyl compound (or the di-2-alkallyl compound). The quantity of the divinylbenzene, acrylic anhydride or α-alkacrylic anhydride employed is advantageously from about 0.25 per cent to about 6 per cent of the weight of the organic compound containing a single $CH_2=C<$ group. Most advantageously, the quantity of the divinylbenzene, acrylic anhydride or α-alkacrylic anhydride is equal to from about 1 per cent to about 3 per cent of the weight of the organic compound containing a single $CH_2=C<$ group.

The following examples will serve to illustrate further the manner of practicing our invention:

*Example 1* n-Butyl α-methacrylate and the bis allyl carbonate of diethylene glycol were mixed in 1:1 proportions by weight. To the mixture was added benzoyl peroxide in an amount equal to 3 per cent by weight of the mixture. The resulting material was carefully filtered to remove all lint or other solid material. To the filtered mixture was added a mixture of divinylbenzene and ethyl vinylbenzene in an amount equal to 1.5 per cent of the volume of the mixture of the methacrylate and the bis allyl carbonate. (The mixture of divinylbenzene and ethylvinylbenzene contained about 75 per cent by weight of divinylbenzene and 25 per cent of ethylvinylbenzene.) The divinylbenzene present was equal to about 2.5 per cent by weight of the n-butyl-α-methacrylate. The mixture thus prepared was then placed in 20 x 75 mm. glass vials, the air expelled from the vials by means of a jet of carbon dioxide and the vials stoppered with an atmosphere of carbon dioxide over the mixture. The stoppered vials were then placed in a constant temperature bath at 70° C. for 16 minutes. At the end of this time, vials were removed from the 70° bath and cooled to stop further polymerization. The material in the vial was a soft gelatinous material which was ready for the cementing of lenses.

*Example 2*

A cement was prepared exactly as in Example 1, except that pure divinylbenzene in an amount equal to 0.5 per cent of the volume of the mixture was employed instead of the mixture of divinylbenzene and ethylvinylbenzene. The pure divinylbenzene employed was equal to about 1.2 per cent by weight of the n-butyl-α-methacrylate.

*Example 3*

A cement was prepared exactly as in Example 1, except that 3 parts of n-butyl α-methacrylate for each part of the bis allyl carbonate of diethylene glycol were employed. The divinylbenzene present was equal to about 1.6 per cent by weight of the n-butyl-α-methacrylate.

*Example 4*

A cement was prepared exactly as in Example 1, except that α-methacrylic anhydride in an amount equal to 1 per cent of the volume of the mixture was employed instead of a mixture of divinylbenzene and ethyl vinylbenzene. The α-methacrylic anhydride employed was equal to about 2.2 per cent by weight of the n-butyl-α-methacrylate.

In any of the foregoing examples, the n-butyl-methacrylate can be replaced with methyl, ethyl, or n-propyl, α-methacrylate, or with styrene, vinyl acetate or methyl acrylate, for example. Instead of using just one compound containing a single $CH_2=C<$ group, two or more of such compounds can be employed. Likewise, one or more of the bis allyl (or bis-2-alkallyl) compounds can be employed and one or more of the groups of divinylbenzene, acrylic anhydride and α-alkacrylic anhydride can be employed.

Various temperatures of polymerization can be employed and various polymerization catalysts can be employed. However, we have found that the polymerization is advantageously effected at from about 60° to about 80° C. in the presence of an organic peroxide polymerization catalyst, e. g., benzoyl peroxide or lauroyl peroxide.

Our new cements, particularly the cement of Example 1, have been found to be heat resistant to the degree that several types of optics can be cemented and then coated with a hard non-reflecting coating, after the cementing operation. This is a great advantage since it eliminates the danger of marring or otherwise spoiling coated objects during the cementing operation. The hard coating necessitates the use of high temperatures or very high vacuum, the temperatures rising to 390° F. or higher at a vacuum of 0.5 micron or less. Our new cements withstand these severe conditions.

Employing our new cements, lenses containing 3 or more components can be cemented by the same procedure used on cemented doublets. Thus, two components can be joined, trued and then heated to set the cement. The third component can then be cemented to the doublet, trued and heated to set the cement with no fear of harming the bond already accomplished in the doublet. This procedure may be repeated as many times as there are components to cement. With thermoplastic cements on the other hand, the cementing of three or more lenses together is difficult and expensive, because complicated truing procedures or truing fixtures are required.

Also by means of our new cements, prism clusters can be cemented all in one operation, our new cements serving to hold the prism in the proper position after optical alignment.

The bis allyl and bis 2-alkallyl carbonates of diethylene glycol and triethylene glycol can be prepared by condensing allyl or 2-alkallyl chlorocarbonates with diethylene glycol or triethylene glycol, if desired, in the presence of an acid-binding agent, for example pyridine. The resulting condensation mixture is washed with water and then distilled under reduced pressure to obtain the bis allyl or bis 2-alkallyl compounds. Allyl and 2-alkallyl chlorocarbonates can be prepared by the action of allyl or a 2-alkallyl alcohol on an excess of phosgene in benzene in the cold.

What we claim as our invention and desire to be secured by Letters Patent of the United States is:

1. A thermosetting lens cement comprising a partially polymerized mixture of from 2 to 8 parts by weight of an ester of α-methacrylic acid and a saturated monohydric alcohol containing from 1 to 4 carbon atoms, from 8 to 2 parts by weight of the bis allyl carbonate of diethylene glycol, and from 0.25 per cent to 6 per cent of the weight of the methacrylic ester of divinylbenzene.

2. A thermosetting lens cement comprising a partially polymerized mixture of from 2 to 8 parts by weight of n-butyl-α-methacrylate, from 8 to 2 parts by weight of the bis allyl carbonate of diethylene glycol, and from 0.25 per cent to 6 per cent of the weight of the n-butyl-α-methacrylate of divinylbenzene.

3. A thermosetting lens cement comprising a partially polymerized mixture of equal parts by weight of n-butyl-α-methacrylate and the bis allyl carbonate of diethylene glycol, and from 1 per cent to 3 per cent of the weight of the n-butyl-α-methacrylate of divinylbenzene.

4. A thermosetting lens cement comprising a partially polymerized mixture of equal parts by weight of n-butyl-α-methacrylate and the bis allyl carbonate of diethylene glycol, and from 0.25 per cent to 6 per cent of the weight of the n-butyl-α-methacrylate of divinylbenzene.

5. A thermosetting lens cement comprising a partially polymerized mixture of equal parts by weight of n-butyl-α-methacrylate and the bis allyl carbonate of diethylene glycol, and from 1 per cent to 3 per cent of the weight of the n-butyl-α-methacrylate of divinylbenzene.

6. A process for preparing a thermosetting lens cement comprising partially polymerizing a mixture of equal parts by weight of n-butyl-α-methacrylate and the bis allyl carbonate of diethylene glycol, and from 1 per cent to 3 per cent of the weight of the n-butyl-α-methacrylate of divinylbenzene.

7. A process for preparing a thermosetting lens cement comprising partially polymerizing, in an atmosphere of carbon dioxide, a mixture of equal parts by weight of n-butyl-α-methacrylate and the bis allyl carbonate of diethylene glycol, and from 1 per cent to 3 per cent of the weight of the n-butyl-α-methacrylate of divinylbenzene.

8. A thermosetting lens cement comprising a partially polymerized mixture of 7 parts by weight of n-butyl-α-methacrylate and 3 parts by weight of the bis allyl carbonate of diethylene glycol, and from 1 per cent to 3 per cent of the weight of the n-butyl-α-methacrylate of divinylbenzene.

9. A process for preparing a thermosetting lens cement comprising partially polymerizing a mixture of from 2 to 8 parts by weight of an organic compound containing a single $CH_2=C<$ group and selected from the group consisting of α-methacrylic esters of saturated monohydric alcohols containing from 1 to 4 carbon atoms, acrylic esters of saturated monohydric alcohols containing from 1 to 4 carbon atoms, vinyl esters of saturated monocarboxylic acids containing from 2 to 4 carbon atoms and styrene, from 8 to 2 parts by weight of an organic compound selected from the group consisting of the bis allyl carbonate of diethylene glycol, the bis allyl carbonate of triethylene glycol, the bis 2-alkallyl carbonates of diethylene glycol in which the alkyl group contains from 1 to 2 carbon atoms and the bis 2-alkallyl carbonate of the triethylene glycol in which the alkyl group contains from 1 to 2 carbon atoms, and from 0.25% to 6% of the weight of the organic compound containing the single $CH_2=C<$ group of divinyl benzene.

10. A process for preparing a thermosetting lens cement comprising partially polymerizing, in an atmosphere of carbon dioxide, a mixture of from 2 to 8 parts by weight of an organic compound containing a single $CH_2=C<$ group and selected from the group consisting of α-methacrylic esters of saturated monohydric alcohols containing from 1 to 4 carbon atoms, acrylic esters of saturated monohydric alcohols containing from 1 to 4 carbon atoms, vinyl esters of saturated monocarboxylic acids containing from 2 to 4 carbon atoms and styrene, from 8 to 2 parts by weight of an organic compound selected from the group consisting of the bis allyl carbonate of diethylene glycol, the bis allyl carbonate of triethylene glycol, the bis 2-alkallyl carbonates of diethylene glycol in which the alkyl group contains from 1 to 2 carbon atoms and the bis 2-alkallyl carbonate of the triethylene glycol in which the alkyl group contains from 1 to 2 carbon atoms, and from 0.25% to 6% of the weight of the organic compound containing the single $CH_2=C<$ group of divinyl benzene.

11. A thermosetting lens cement comprising a partially polymerized mixture of from 2 to 8 parts by weight of an organic compound containing a single $CH_2=C<$ group and selected from the group consisting of α-methacrylic esters of saturated monohydric alcohols containing from 1 to 4 carbon atoms, acrylic esters of saturated monohydric alcohols containing from 1 to 4 carbon atoms, vinyl esters of saturated monocarboxylic acids containing from 2 to 4 carbon atoms, and styrene, from 8 to 2 parts by weight of an organic compound selected from the group consisting of the bis allyl carbonate of diethylene glycol, the bis allyl carbonate of triethylene glycol, the bis-2-alkallyl carbonates of diethylene glycol in which the alkyl group contains from 1 to 2 carbon atoms, and the bis-2-alkallyl carbonates of triethylene glycol in which the alkyl group contains from 1 to 2 carbon atoms, and from 0.25 per cent to 6 per cent of the weight of the organic compound containing the single $CH_2=C<$ group of divinylbenzene.

WILLIAM F. PARSONS.
JOHN R. DANN.

REFERENCES CITED

The following references are of record in the file of this patent:

UNITED STATES PATENTS

| Number | Name | Date |
| --- | --- | --- |
| 2,060,104 | Moulton | Nov. 10, 1936 |
| 2,092,789 | Tillyer | Sept. 14, 1937 |
| 2,211,689 | Dittmar | Aug. 13, 1940 |
| 2,260,005 | D'Alelio | Oct. 21, 1941 |
| 2,320,533 | Muskat et al. | June 1, 1943 |
| 2,340,109 | D'Alelio | Jan. 25, 1944 |
| 2,370,565 | Muskat et al. | Feb. 27, 1945 |
| 2,378,197 | D'Alelio | June 12, 1945 |